(12) United States Patent
Lee et al.

(10) Patent No.: US 7,822,652 B2
(45) Date of Patent: Oct. 26, 2010

(54) SYSTEM AND METHOD FOR HANDLING PRE-PICKED INVOICES IN ORDER FULFILLMENT

(75) Inventors: Jieh-Sheng Lee, Lugang Township, Changhua County (TW); Yiau-Shien Wu, Hsinchu (TW); Che-Chih Chiu, Dayuan Township, Taoyuan County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1551 days.

(21) Appl. No.: 10/677,802

(22) Filed: Oct. 2, 2003

(65) Prior Publication Data

US 2005/0075953 A1  Apr. 7, 2005

(51) Int. Cl.
*G06Q 10/00* (2006.01)
(52) U.S. Cl. ............... 705/28; 705/1; 705/8; 705/7; 705/26; 705/29; 705/37; 705/22
(58) Field of Classification Search ............ 705/28
See application file for complete search history.

(56) References Cited

U.S. PATENT DOCUMENTS

| | | | |
|---|---|---|---|
| 6,289,382 B1* | 9/2001 | Bowman-Amuah | 709/226 |
| 6,633,878 B1* | 10/2003 | Underwood | 707/100 |
| 2002/0072988 A1* | 6/2002 | Aram | 705/26 |
| 2002/0120459 A1* | 8/2002 | Dick et al. | 705/1 |
| 2002/0124109 A1* | 9/2002 | Brown | 709/246 |
| 2003/0061081 A1* | 3/2003 | Kellond et al. | 705/7 |
| 2003/0172007 A1* | 9/2003 | Helmolt et al. | 705/28 |
| 2003/0233290 A1* | 12/2003 | Yang et al. | 705/28 |
| 2005/0038684 A1* | 2/2005 | Wang et al. | 705/8 |

OTHER PUBLICATIONS e-Manufacturing's foundation. Mann, Paul. Manufacturing Systems Europe, vol. 3, No. 7, p. 26, Summer 2000.*

* cited by examiner

*Primary Examiner*—F. Zeender
*Assistant Examiner*—Fawaad Haider
(74) *Attorney, Agent, or Firm*—Thomas, Kayden, Horstemeyer & Risley

(57) ABSTRACT

A system of order fulfillment. The system includes a pre-picking unit and a matching engine. The pre-picking unit picks orders and WIP (Work-In-Process) lots with forecast finishing dates to generate a pre-picked invoice including the designated orders and WIP lots. The matching engine generates a real invoice corresponding to the pre-picked invoice for one designated order and the matched WIP lot that reaches completion, and generates a new pre-picked invoice containing remaining orders, WIP lots, and corresponding settings.

32 Claims, 3 Drawing Sheets

SYSTEM AND METHOD FOR HANDLING PRE-PICKED INVOICES IN ORDER FULFILLMENT

BACKGROUND

The present invention relates to order fulfillment, and particularly to a system and method for handling pre-picked invoices in order fulfillment.

Order fulfillment uses manual matching of sales orders with corresponding finished goods, referred to as "picking". After the picking process, the order fulfillment system generates invoices corresponding to the selection items to confirm the shipment. Once the invoices are confirmed, subsequent packaging and shipment is enabled.

FIG. 1 illustrates a schematic diagram of conventional order fulfillment. As shown in FIG. 1, the MES (Manufacturing Execution System) 110 transfers the information for finished goods 101 corresponding to WIP (Work-In-Process) lots to the order fulfillment system 100. After the sales order 102 and corresponding finished goods 101 are picked, the order fulfillment system 100 generates an invoice 103 for the sales order 102 and the finished goods 101, and packing process 104 is performed according to the invoice 103.

The picking, invoice and packing processes form a sequential workflow for order fulfillment. Since these processes require on-site handling of information or materials, step by step, on-site operations may be interrupted by time differences or off days. The efficiency of order fulfillment is decreased and workflow halted. In addition, orders must wait until finished goods are ready for invoicing. Without the invoice, the shipment cannot proceed.

SUMMARY OF THE INVENTION

It is therefore an object of the present invention to provide a system and method for handling pre-picked invoices in order fulfillment.

To achieve the above objects, the invention is directed to novel systems and methods for overcoming conventional order fulfillment problems. In one embodiment, a system of order fulfillment in an IC foundry comprises a pre-picking unit and a matching engine. The pre-picking unit picks an order corresponding to an IC product and at least a first lot thereof having WIP status to generate a pre-picked invoice including the order and the first lot, in which one order could match to multiple lots in one invoice, and the "first" lot is just used to identify one of the lots in the order. The matching engine determines whether the first lot has achieved F/G (Finished Goods) status at a first shipping time, and, if so, generates a first real invoice corresponding to the pre-picked invoice for the order and the first lot.

The pre-picking unit further picks a second lot corresponding to the IC product having WIP status for the pre-picked invoice, and the matching engine further generates a new pre-picked invoice if the second lot has not yet achieved F/G status at the first shipping time. The matching engine further determines whether the second lot has achieved F/G status at a second shipping time, and generates a second real invoice corresponding to the new pre-picked invoice for the order and the second lot if the second lot has achieved F/G status. The matching engine further closes the new pre-picked invoice after the second real invoice is generated.

In another embodiment, a method provides order fulfillment in an IC foundry. First, an order corresponding to an IC product and a first lot corresponding to the IC product having WIP status are picked to generate a pre-picked invoice including the order and the first lot. Then, it is determined whether the first lot has achieved F/G status at a first shipping time, and a first real invoice corresponding to the pre-picked invoice is generated for the order and the first lot if the first lot has achieved F/G status.

In addition, a second lot corresponding to the IC product having WIP status is picked for the pre-picked invoice. If the second lot has not yet achieved F/G status at the first shipping is time, a new pre-picked invoice is generated. It is further determined whether the second lot has achieved F/G status at a second shipping time. If the second lot has achieved F/G status, a second real invoice corresponding to the new pre-picked invoice is generated for the order and the second lot, and the new pre-picked invoice is closed after the second real invoice is generated.

The present invention increases the efficiency of order fulfillment by converting pre-picked invoices to real invoices periodically and automatically without on-site involvement, and shipments can be prepared in advance irrespective of time differences or off days.

The present invention also generates multiple real invoices from one pre-picked invoice without manual involvement as picked WIP lots achieve F/G status randomly, matching corresponding orders.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

As summarized above, the present invention is directed to novel systems and methods for overcoming conventional manufacturing planning problems. It is understood that for discussion purposes, illustration is made herein to semiconductor foundry manufacturing (i.e., wafer fabrication in an IC foundry). However, the present invention is not limited thereto.

Figure 1:
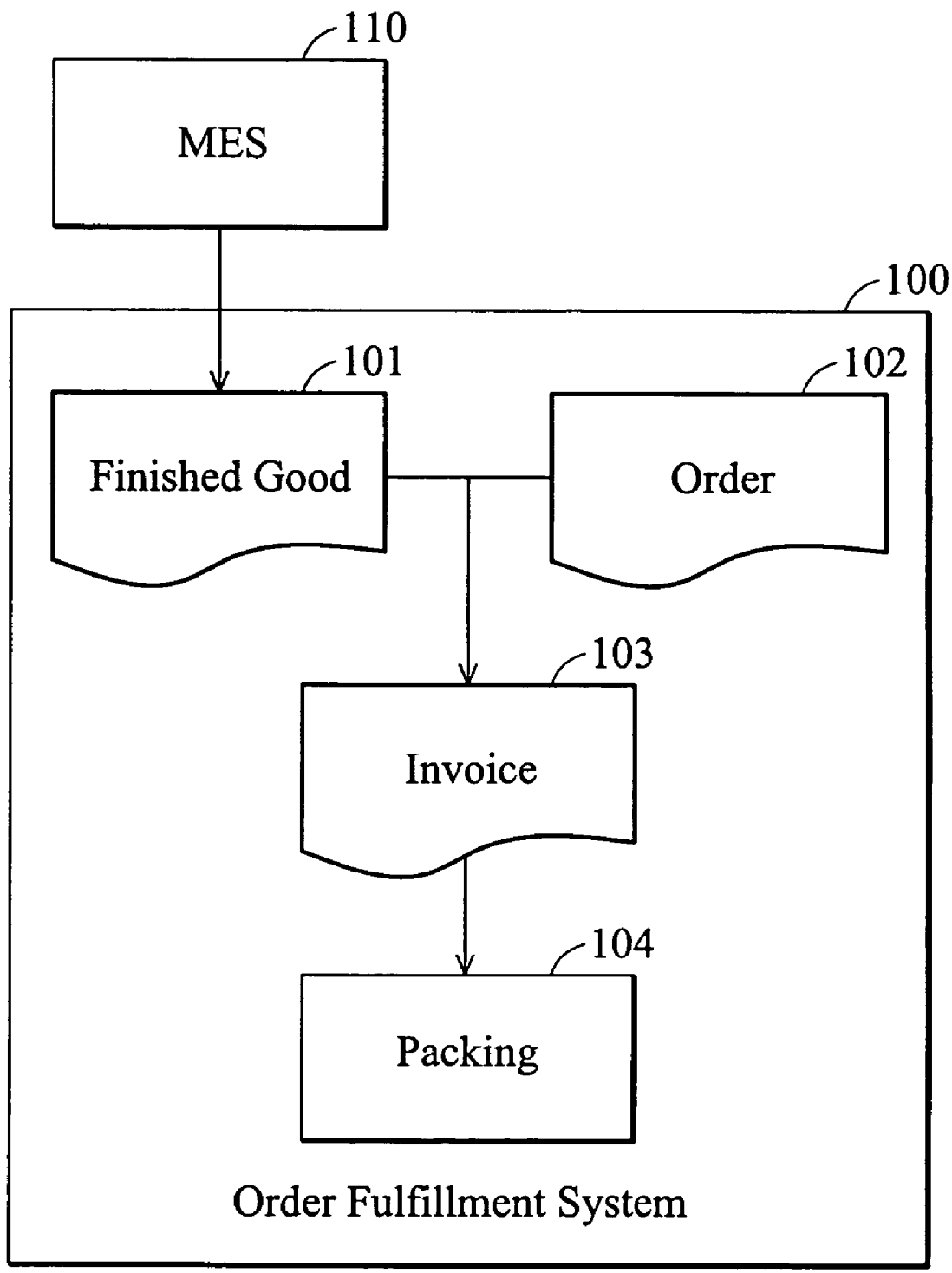
FIG. 1 is a schematic diagram of conventional order fulfillment.
Figure 2:
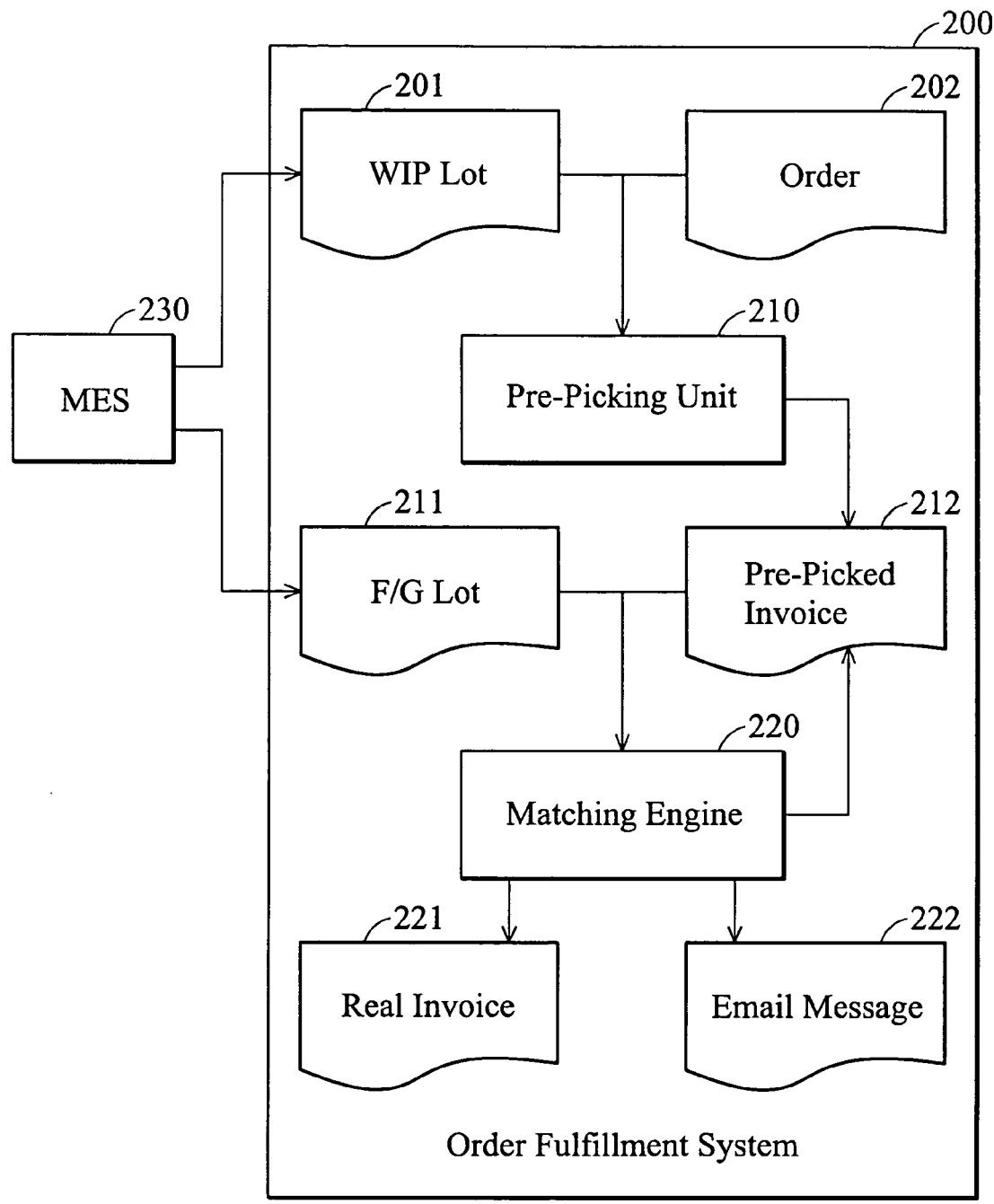
FIG. 2 is a schematic diagram of the architecture of the system of order fulfillment according to the present invention.

FIG. 2 illustrates the architecture of the system of order fulfillment according to the present invention. The order fulfillment system 200 includes a pre-picking unit 210 and a matching engine 220.

The pre-picking unit 210 allows picking of orders 202 corresponding to an IC product and WIP lots 201 (running in a production line) corresponding to the same IC product having WIP status, in which the information of WIP lots 201 can be obtained from the MES 230. The pre-picking unit 210 may provide an interface to input corresponding conditions, such as a shipping time, release date, billing information, and forecast completion date of WIP lots for the picking process. WIP lots conforming to the conditions are automatically retrieved and displayed in the interface for selection. It is understood that the pre-picking unit 210 further determines whether the WIP lots have already been picked for another pre-picked invoice to prevent duplicate picking, and, if so, cancels or disables the WIP lots.

One WIP lot (mother lot) may be split into a plurality of child lots having WIP status. The picking process of the invention is better equipped to better handle the dynamic nature of lot splitting which means a portion of changes in lot ID during manufacturing, for example, a mother lot C12345.00 splits into child lots C12345.01 and C12345.02, retaining the setting for subsequent invoice generation. In addition, the pre-picking unit 210 may further define a shipment attribute, such as a Customs declaration for the pre-picked invoice 212. The shipment attribute may be also pre-defined by customers via a web interface in an E-Commerce platform. After picking, the pre-picking unit 210 generates a pre-picked invoice 212 for the selected orders 202 and the assigned WIP lots 201.

The matching engine 220 periodically and automatically processes one shipping point. Before corresponding processing, the matching engine 220 determines whether the shipping point is locked or not. If not, the matching engine 220 first locks the shipping point, and records the timestamp of the execution, and proceeds. Further, the matching engine 220 loads currently open pre-picked invoice 212 and updates execution log and status, in which the execution log and status may be queried by users and resulted in reports. In addition, for each execution, the matching engine 220 generates a sequence ID as identification for corresponding information generated in one batch.

The matching engine 220 determines whether the assigned WIP lots 201 have become F/G lots 211, that is, whether the WIP lots have achieved F/G status. It is understood that the information of F/G lots 211 can be also obtained from the MES 230. In addition, the matching engine 220 also determines whether the selected orders 202 in the pre-picked invoice 212 match desired attributes, such as wafer quantity and minimum and maximum range of the F/G lots 211. The matching engine 220 determines whether all selected orders 202 in the pre-picked invoice 212 have progressed to corresponding F/G lots 211. If not, the matching engine 220 generates a new pre-picked invoice 212 automatically and retains remaining orders and settings in the new pre-picked invoice 212. It is understood that if no match at all, the same pre-picked invoice will remain the same one instead of having a new one for next run. This is a powerful feature, allowing creation of one pre-picked invoice for automatic generation of multiple real invoices subsequently.

The matching engine 220 then directs internal functions to generate a real invoice 221 corresponding to the pre-picked invoice for the matched orders 202 and F/G lots 211. The matching engine 220 further sends an email message to notify related personnel when the real invoice 221 is generated. It is understood that the notification method can be employed by both internal and external users, such as customers, by other channels such as fax, instant messaging, and others. Further, the matching engine 220 updates execution log with successful results or exceptions during process, and unlocks the shipping point for the same shipping site and waits for the next batch to run after the process is complete. The matching engine 220 further determines whether all assigned WIP lots in the pre-picked invoice 212 have become F/G lots, and decides to close the pre-picked invoice 212 as completed if all lots are shipped.

In addition, the matching engine 220 better copes with lot splitting according to the defined settings, generating real invoices by determining whether the child lots should be handled the same as the mother lot, the mother lot having been split into a plurality of child lots with different lot IDs and separate physical locations, and the child lots comprising the same products as the mother lot with a different lot ID. The real invoices generated by the matching engine 220 are used in the packing stage of order fulfillment.

Figure 3:
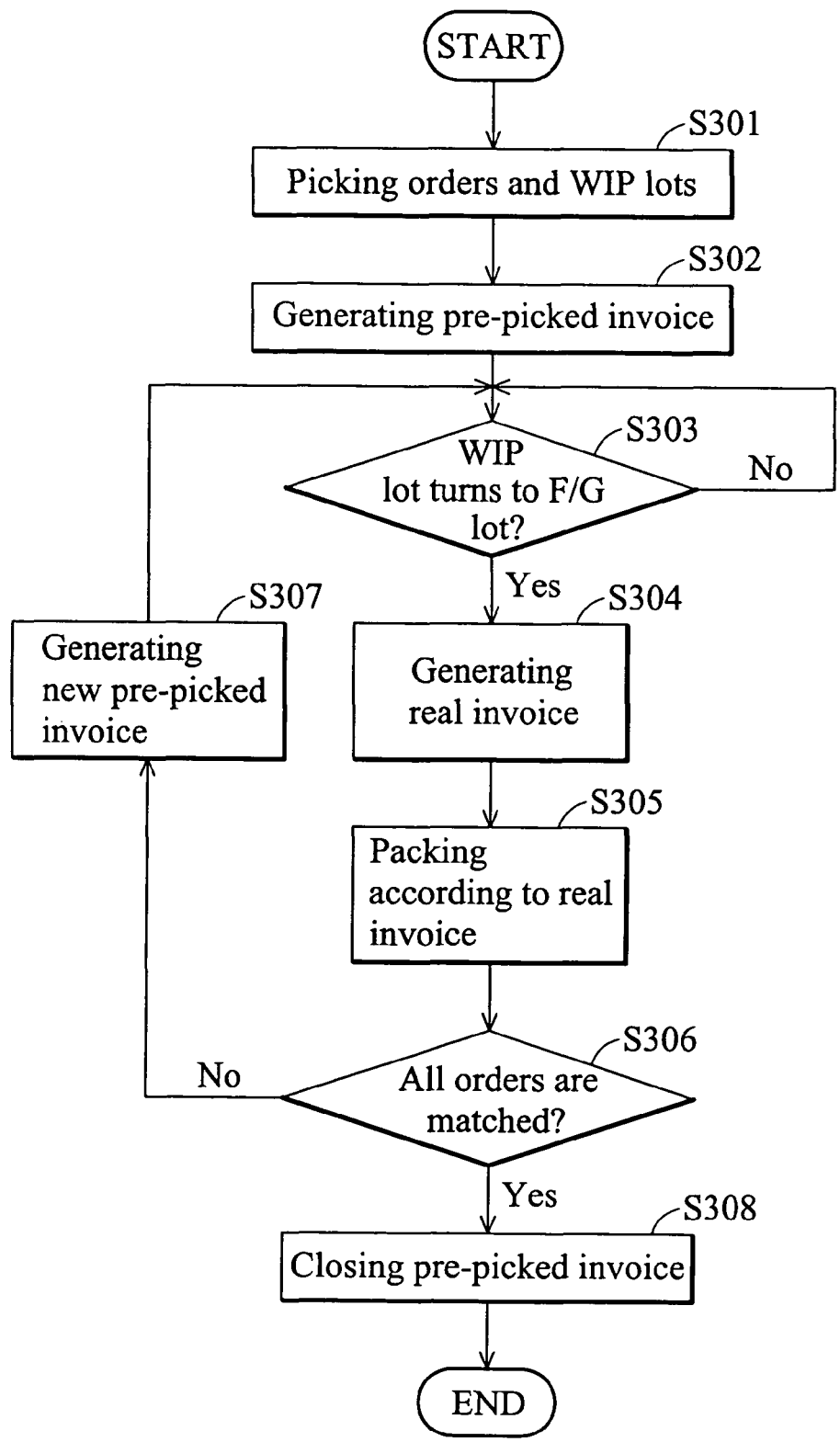
FIG. 3 is a flowchart of the method of order fulfillment according to the present invention.

FIG. 3 shows the process of the method of order fulfillment according to the present invention. First, in step S301, at least one order and WIP lot are picked, and in step S302, a pre-picked invoice including the order and the WIP lot is generated. It is understood that each WIP lot may be picked according to its predicted finish date. Then, in step S303, it is determined whether designated WIP lots have achieved F/G status. If not (No in step S303), the flow returns to step S303. If one of the WIP lots has achieved F/G status (Yes in step S303), in step S304, a real invoice corresponding to the pre-picked invoice is generated for the order and the WIP lot that has achieved F/G status.

Then, in step S305, the packing process is performed according to the generated real invoice, and an email message sent to notify pertinent personnel. Similarly, one WIP lot may be split into a plurality of child lots having WIP status, in which case the method manages the lot splitting according to predefined settings, generating real invoices by determining whether the child lots should be handled the same as the mother lot.

In addition, in step S306, it is determined whether all orders or corresponding lots in the pre-picked invoice are matched by corresponding F/G lots. If not (No in step S306), in step S307, a new pre-picked invoice containing remaining orders, WIP lots and corresponding settings is automatically generated, and the flow returns to step S303. If all assigned WIP lots in the pre-picked invoice have achieved F/G status and all orders in the pre-picked invoice have been matched (Yes in step S306), in step S308, the pre-picked invoice is closed.

As a result, using the system and method of order fulfillment according to the present invention, orders and corresponding finished goods can be pre-picked in advance, and the real invoices automatically generated without on-site involvement. In addition, the shipment can be prepared in advance irrespective of time differences or off days.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of order fulfillment, comprising:
a machine executing:
a pre-picking unit picking an order corresponding to a product, receiving information regarding at least a first lot corresponding to the same product having WIP (Work In Process) status from an MES (Manufacturing Execution System), and picking at least the first lot corresponding to the same product having WIP status to generate a pre-picked invoice including the order and the first lot, wherein the first lot having WIP status representing the first lot is currently manufactured, and the pre-picking unit further determines whether the first lot having WIP status is picked for another pre-picked invoice, and, if so, not to show the first lot for selection; and
a matching engine to determine whether the first lot has achieved F/G (Finished Goods) status at a first shipping time, and, if so, to automatically generate a first real invoice corresponding to the pre-picked invoice for the order and the first lot.

2. The system of claim 1 wherein the first lot has a predetermined forecast date to achieve F/G status.

3. The system of claim 1 wherein the pre-picking unit further defines a shipment attribute comprising a Customs declaration for the pre-picked invoice.

4. The system of claim 1 wherein the matching engine further sends an email notification when the first real invoice is generated.

5. The system of claim 1 wherein if the first lot having WIP status is split into a plurality of child lots having WIP status, the matching engine determines whether the child lots of the first lot have achieved F/G status at the first shipping time.

6. The system of claim 1 wherein the pre-picking unit further picks a second lot corresponding to the product having WIP status for the pre-picked invoice, and the matching engine further generates a new pre-picked invoice if the second lot has not yet achieved F/G status at the first shipping time.

7. The system of claim 6 wherein the matching engine further determines whether the second lot has achieved F/G status at a second shipping time, and, if so, generates a second real invoice corresponding to the new pre-picked invoice for the order and the second lot.

8. The system of claim 7 wherein the matching engine further closes the new pre-picked invoice if the second real invoice has been generated.

9. A method of order fulfillment for an IC (Integrated Circuit) foundry, for use in a computer, comprising the steps of:
picking an order corresponding to an IC (Integrated Circuit) product by the computer;
receiving information regarding at least a first lot corresponding to the same IC product having WIP (Work In Process) status from an MES (Manufacturing Execution System) by the computer, wherein the first lot having WIP status representing the first lot is currently manufactured;
determining whether the first lot having WIP status is picked for another pre-picked invoice by the computer, and, if so, not to show the first lot for selection;
picking the first lot corresponding to the same IC product having WIP status by the computer;
generating a pre-picked invoice including the order and the first lot by the computer;
determining whether the first lot has achieved F/G (Finished Goods) status at a first shipping time by the computer; and
automatically generating a first real invoice corresponding to the pre-picked invoice for the order and the first lot if the first lot has achieved F/G status by the computer.

10. The method of claim 9 wherein the first lot has a predetermined forecast date to achieve F/G status.

11. The method of claim 9 further comprising defining a shipment attribute comprising a Customs declaration for the pre-picked invoice by the computer.

12. The method of claim 9 further comprising sending an email notification by the computer when the first real invoice is generated.

13. The method of claim 9 further comprising determining whether a plurality of child lots split from the first lot having WIP status have achieved F/G status at the first shipping time by the computer.

14. The method of claim 9 further comprising picking a second lot corresponding to the IC product having WIP status for the pre-picked invoice by the computer, and generating a new pre-picked invoice by the computer if the second lot has not yet achieved F/G status at the first shipping time.

15. The method of claim 14 further comprising determining whether the second lot has achieved F/G status at a second shipping time by the computer, and, if so, generating a second real invoice corresponding to the new pre-picked invoice for the order and the second lot by the computer.

16. The method of claim 15 further comprising closing the new pre-picked invoice by the computer if the second real invoice has been generated.

17. A machine-readable storage medium storing a computer program which when executed causes a computer to perform a method of order fulfillment, comprising the steps of:
picking an order corresponding to a product by the computer;
receiving information regarding at least a first lot corresponding to the same product having WIP (Work In Process) status from an MES (Manufacturing Execution System) by the computer, wherein the first lot having WIP status representing the first lot is currently manufactured;
determining whether the first lot having WIP status has been picked for another pre-picked invoice, and, if so, not to show the first lot for selection;
picking the first lot corresponding to the same product having WIP status by the computer;
generating a pre-picked invoice including the order and the first lot;
determining whether the first lot has achieved F/G (Finished Goods) status at a first shipping time; and
automatically generating a first real invoice corresponding to the pre-picked invoice for the order and the first lot if the first lot has achieved F/G status.

18. The storage medium of claim 17 wherein the first lot has a predetermined forecast date to achieve F/G status.

19. The storage medium of claim 17 further comprising defining a shipment attribute comprising a Customs declaration for the pre-picked invoice.

20. The storage medium of claim 17 further comprising sending email notification when the first real invoice is generated.

21. The storage medium of claim 17 further comprising determining whether a plurality of child lots split from the first lot having WIP status have achieved F/G status at the first shipping time.

22. The storage medium of claim 17 further comprising picking a second lot corresponding to the product having WIP status for the pre-picked invoice, and, if so, generating a new pre-picked invoice.

23. The storage medium of claim 22 further comprising determining whether the second lot has achieved F/G status at a second shipping time, and, if so, generating a second real invoice corresponding to the new pre-picked invoice for the order and the second lot.

24. The storage medium of claim 23 further comprising closing the new pre-picked invoice if the second real invoice has been generated.

25. A method of order fulfillment for use in a computer, comprising the steps of:

picking an order by the computer;

receiving information regarding at least a first lot having WIP (Work In Process) status from an MES (Manufacturing Execution System) by the computer, wherein the first lot having WIP status representing the first lot is currently manufactured;

determining whether the first lot having WIP status is picked for another pre-picked invoice by the computer, and, if so, not to show the first lot for selection;

picking the first lot having WIP status by the computer;

generating a pre-picked invoice including the order and the first lot by the computer;

determining whether the first lot has achieved F/G status at a first shipping time by the computer; and automatically generating a first real invoice corresponding to the pre-picked invoice for the order and the first lot if the first lot has achieved F/G (Finished Goods) status by the computer.

26. The method of claim 25 wherein the first lot has a predetermined forecast date to achieve F/G status.

27. The method of claim 25 further comprising defining a shipment attribute comprising a Customs declaration for the pre-picked invoice by the computer.

28. The method of claim 25 further comprising sending an email notification by the computer when the first real invoice is generated.

29. The method of claim 25 further comprising determining whether a plurality of child lots split from the first lot having WIP status have achieved F/G status at the first shipping time by the computer.

30. The method of claim 25 further comprising picking a second lot corresponding to the IC product having WIP status for the pre-picked invoice by the computer, and generating a new pre-picked invoice by the computer if the second lot has not yet achieved F/G status at the first shipping time.

31. The method of claim 30 further comprising determining whether the second lot has achieved F/G status at a second shipping time by the computer, and generating a second real invoice corresponding to the new pre-picked invoice for the order and the second lot by the computer if the second lot has achieved F/G status.

32. The method of claim 31 further comprising closing the new pre-picked invoice by the computer if the second real invoice has been generated.

* * * * *